United States Patent [19]

Böttle et al.

[11] Patent Number: 4,654,866
[45] Date of Patent: Mar. 31, 1987

[54] COMBINED NARROW BAND AND BROAD BAND TELEPHONE COMMUNICATION SYSTEM

[75] Inventors: Dietrich Böttle, Salach; Xuan Ho Tan, Tamm, both of Fed. Rep. of Germany

[73] Assignee: International Standard Electric Corporation, New York, N.Y.

[21] Appl. No.: 620,417

[22] Filed: Jun. 14, 1984

[30] Foreign Application Priority Data

Jun. 30, 1983 [DE] Fed. Rep. of Germany ....... 3323573

[51] Int. Cl.⁴ .................. H04M 11/00; H04N 7/14
[52] U.S. Cl. .......................... 379/54; 358/85
[58] Field of Search .............. 179/2 TS, 2 TV, 18 C; 358/85

[56] References Cited

U.S. PATENT DOCUMENTS

| | | | |
|---|---|---|---|
| 3,573,377 | 4/1971 | Anderson et al. | 179/18 C X |
| 3,662,110 | 5/1972 | Van Fossen et al. | 179/2 TS |
| 3,701,849 | 10/1972 | Stapleton | 179/2 TS |
| 3,922,491 | 11/1975 | Björk et al. | 179/2 TV |

FOREIGN PATENT DOCUMENTS 45-40006 12/1970 Japan .................. 179/2 TS

Primary Examiner—Keith E. George
Attorney, Agent, or Firm—John T. O'Halloran; Robert P. Seitter

[57] ABSTRACT

An integrated communication system (e.g., BIGFON) includes the narrow-band telephone network and a superposed video-telephone network. The path search for setting up calls in the telephone network is carried out with the aid of the telephone call numbers. To permit a video-telephone network structure independent of the structure of the telephone network, each subscriber of the video-telephone network must be assigned a separate video-telephone call number for the path search in the broadband network. In order that a subscriber does not have to dial two different numbers to set up a video-telephone call, each exchange (V1, V2) of the communication system includes a mapping circuit (ZS) which establishes for each video-telephone subscriber (TEA, TEB) a correspondence between his or her telephone call number and a video-telephone call number serving to set up calls in the video-telephone network. This video-telephone call number can be called up from the mapping circuit (ZS) via the telephone network (FN).

3 Claims, 2 Drawing Figures

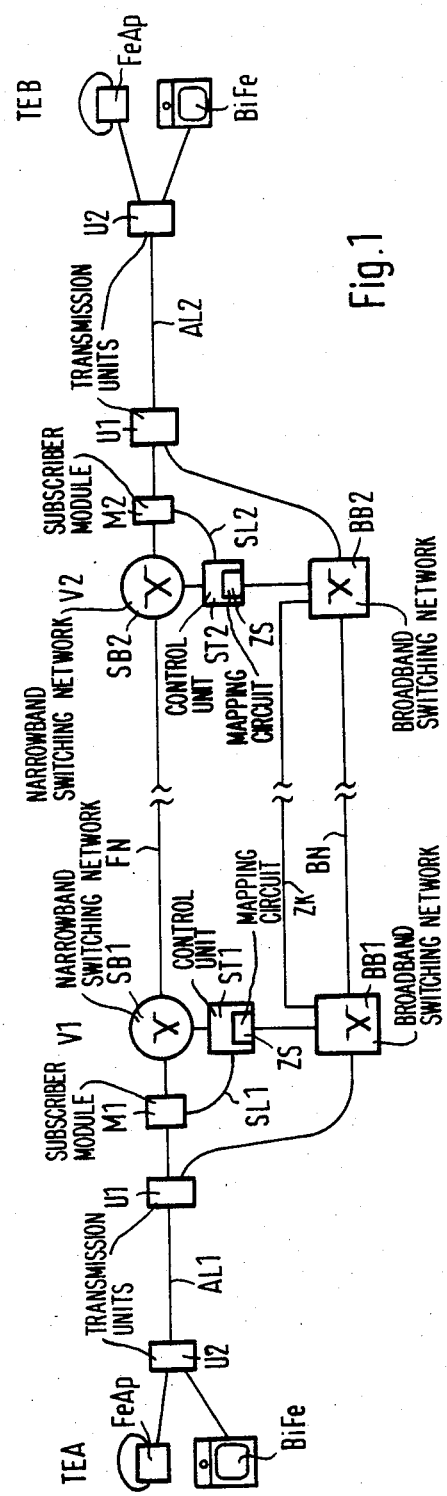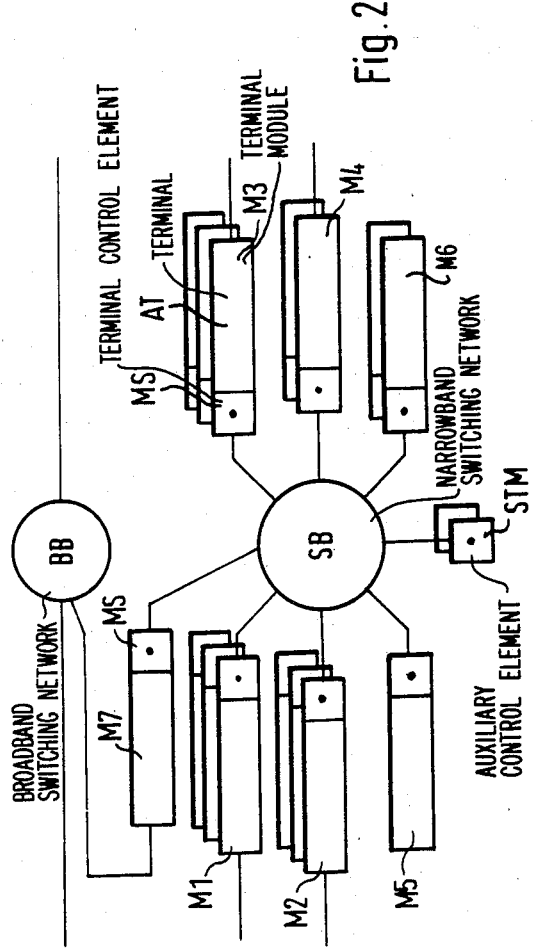

COMBINED NARROW BAND AND BROAD BAND TELEPHONE COMMUNICATION SYSTEM

BACKGROUND OF THE INVENTION

The present invention relates to an integrated communication system as set forth in the preamble of claim 1.

Such a modern communication system contains, besides the conventional narrow-band communication networks, i.e., the telephone network in particular, a broadband communication network which is superposed on the narrow-band networks and permits the transmission of animated pictures as are needed for video telephony and for the distribution of television programs (e.g., DE-OS No. 25 38 638). A communication system of this kind which uses optical waveguides as transmission media at least at the subscriber's level is also known under the abbreviation "BIGFON". If the existing analog or digital narrow-band telephone network is to be supplemented by a broadband network to permit broadband video communication, the following requirements should be satisfied:

1. It should be possible to convert pure telephone subscriber facilities into video-telephone subscriber facilities at any time, with no or only little advance work having to be performed in the broadband network for subscribers who wish to subscribe to the video-telephone service only at a later time or possibly not at all.

2. When the video-telephone service is introduced, the telephone subscriber should not have to change his call number; to set up a video-telephone call, he should not have to dial a video-telephone call number in addition to the telephone number.

In a telephone network, path search is commonly carried out on the basis of the call numbers, i.e., the number of a called subscriber gives information on how and in which exchanges a path has to be completed and where a subscriber with a given call number is connected to an exchange. If the telephone call numbers are to be used for a broadband switching network, and the structure of the broadband network differs from that of the telephone network, it is first necessary to determine to which point of the broadband switching network or—if there are two or more broadband exchanges—to which broadband exchange the subscriber with a given telephone call number is connected. This can be done, for example, with the aid of a table which is stored in a memory and establishes a correspondence between the telephone call numbers and the video-telephone call numbers. To be able to assign call numbers in the narrow-band network and in the broadband network in any correspondence, the video-telephone call numbers must be stored multiply, i.e., in all exchanges. This entails a certain expense in the event of a change of the call number or the subscriber line, because the call numbers stored in a multitude of exchanges have to be changed. A more advantageous solution is described in the following.

SUMMARY OF THE INVENTION

The object of the invention is to permit a telephone call and a video-telephone call to be set up with the aid of a single call number.

The principal advantages of the invention are that the structure of the broadband communication network can be completely independent of the structure of the telephone network, and that, in case of a call-number change, only the call-number assignment in a single exchange has to be changed.

BRIEF DESCRIPTION OF THE DRAWING

An embodiment of the invention will now be explained with reference to the accompanying drawing, in which:

FIG. 1 shows an integrated communication system in accordance with the invention, and FIG. 2 shows a digital exchange of the integrated communication system of FIG. 1.

DESCRIPTION OF THE PREFERRED EMBODIMENTS

Of the integrated communication system in accordance with the invention, FIG. 1 shows in simplified form: a first subscriber facility TEA connected to a first exchange V1, a second subscriber facility TEB connected to a second exchange V2, and the two communication networks interconnecting the two exchanges V1 and V2. Each of the exchanges V1, V2 contains a narrow-band switching network SB1, SB2, a control unit ST1, ST2, and a broadband switching network BB1, BB2.

The subscriber facility TEA, hereinafter regarded as the facility of the calling subscriber or A-subscriber, contains a telephone set FeAp, a video-telephone terminal BiFe, and a transmission unit U2 connected to a transmission unit U1 of the exchange V1 by a subscriber line AL1. The subscriber line AL1 is advantageously implemented as an optical waveguide, in which case each of the transmission units U1 and U2 contains an electric-to-optical transducer and an optical-to-electric transducer.

The transmission unit U1 is connected to a subscriber module M1 and to the broadband switching network BB1 of the exchange V1. The module M1 is connected to the control unit ST1 by a signalling line SL1, over which the signalling information is transmitted. If the narrow-band switching network is digital, this signalling line is not necessary.

The control unit ST1 contains the additional controllers required for the broadband switching network BB1 and transmits the signalling and control information required to handle the calls in the video-telephone network over the telephone network. Frequently, the control unit ST1 has a plurality of broadband switching networks BB1 connected to it, which are not shown to simplify the illustration.

The construction of the second exchange V2 and of the subscriber facility TEB connected thereto—regarded in the following as the facility of the called subscriber or B-subscriber—corresponds exactly to the construction of the exchange V1 and the subscriber facility TEA.

The narrow-band switching networks SB1 and SB2 are interconnected by the conventional analog telephone network or by a digital telephone network FN. The latter is shown only schematically by a narrow-band path; it contains a plurality of exchanges and, as a rule, has a hierarchical structure.

The broadband switching networks BB1 and BB2 are interconnected by a video-telephone network BN, which is depicted only schematically, and by signalling channels ZK. If the telephone network FN is a digital network, it, too, comprises common signalling channels interconnecting the exchanges. The signalling channels ZK for the broadband paths may be integrated with those common signalling channels or with the broadband paths of the video-telephone network BN.

The video-telephone network BN includes a major number of exchanges, too, with the local exchanges V1, V2, etc. interconnected by broadband tandem exchanges of a higher hierarchy level.

Each of the exchanges V1, V2 includes a mapping circuit ZS, which establishes for a telephone subscriber connected to the exchange a correspondence between the telephone-call number and a video-telephone call number as soon as he or she subscribes to the video-telephone service.

In the video-telephone network, the subscriber terminations are assigned video-telephone call numbers independent of the telephone network, which need not be known to the subscribers, however. The correspondence between the two call-number systems is established and stored only in the exchange to which the subscribes are connected.

The mapping circuit ZS may be located centrally at the exchange; in the embodiment of FIG. 1, it is located in the control unit ST1, ST2. It may also be associated with each subscriber by being located in the subscriber module M1, M2 or the subscriber facility TEA, TEB, for example.

When a video-telephone call is to be set up from the A-subscriber to the B-subscriber, i.e., from the exchange V1, the broadband path to the B-subscriber connected to another exchange is first unknown. At the exchange V1, only the video-telephone call number of the calling subscriber and the telephone call number of the called subscriber are known. To find the broadband path from the exchange V1 to the called subscriber, a narrow-band path to the exchange V2 is set up with the aid of the telephone call number, and the video-telephone call number of the called subscriber is called up from the mapping circuit ZS of this exchange V2. The video-telephone number of the called subscriber is thus known at the exchange V1 and can be used for the path search in the broadband network BN. Alternatively, the path search may start at the exchange V2 if the latter is informed of the video-telephone call number of the called subscriber instead of or in addition to the inquiry described above.

The mapping circuits ZS contain essentially a memory in which the correspondence between the telephone call numbers and the video-telephone call numbers is stored in the form of a table. They also include the access and read/write circuits required to call up and change such a correspondence.

A video-telephone call is set up as follows. A telephone call has been set up between the subscriber A and the subscriber B. Both subscribers want to set up a video call and, therefore, depress a "video-telephone button" at their respective subscriber facilities. In the subscriber module M1, a signalling word triggered by the subscriber A is then recognized which indicates the video-call attempt and contains the telephone call number of the B-subscriber. Since the call attempt is a video-call attempt, this information is passed from the subscriber module M1 to the control unit ST1, with the video-telephone call number A*, assigned to the telephone call number A, being read from the mapping circuit ZS. The control unit ST1 now sends an inquiry containing the destination address B and the telephone call number A and/or the videotelephone call number A* over the telephone network FN to the subscriber module M2 at the exchange V2. There, the video-telephone destination call number B* is assigned to the destination call number B by the mapping circuit ZS, and the information A*, B* is evaluated in the control unit ST2. The control unit ST2, provided it has received the consent of the subscriber B, can now cause a broadband channel to be switched through the broadband switching network BB2. However, it can also send the video-telephone call number B* over the telephone network FN to the control unit ST1, which then initiates the setting up of a broadband call through the broadband switching network BB1.

FIG. 2 illustrates the architecture of a System 12 digital exchange, with which the integrated communication network in accordance with the invention can be implemented in an advantageous manner. The exchange contains a narrow-band switching network SB, several terminal modules M1, M2 . . . , and an auxiliary control element STM, which performs essentially only coordinative tasks. The control of the exchange is characterized by a decentralized structure: each module consists of a so-called terminal AT and a terminal control element MS (cf. module M3).

The digital exchange comprises essentially the following modules: an analog subscriber module M1, a digital subscriber module M2, a digital trunk module M3, a common channel module M4, a clock and tones module M5, and a computer peripherals module M6.

For use in the integrated communication system, the exchange is connected to one or more broadband switching networks BB via a so-called video communication module M7. The control unit ST1 of FIG. 1 corresponds essentially to the terminal control element MS of the module M7, but a few of the control functions may also be performed in the auxiliary control element STM and in the terminal control elements MS of the other modules of the exchange. Most of the modules M1 to M7 are duplicated or triplicated as indicated in the drawing.

We claim:

1. An integrated communication system comprising:
   a plurality of telephone exchanges;
   a narrowband telephone network interconnecting said plurality of exchanges;
   a broadband video telephone network interconnecting said plurality of exchanges;
   each of said exchanges comprising a control unit, a mapping circuit connected to said control unit, said mapping circuit including memory means for establishing correspondence in the form of a table between telephone call numbers and video telephone call numbers only for video telephone subscribers assigned to that exchange, and a plurlity of telephone subscriber modules each connected to one or more subscribers, and
   means responsive to an initiation of a video telephone call from a video telephone subscriber connected to one of said exchanges to a video telephone subscriber connected to another of said exchanges, said subscribers being linked to each other over said narrowband telephone network, for obtaining the video telephone number of the calling video subscriber by inquiry of the control unit at said one exchange to the mapping circuit thereat and for obtaining the video telephone number of the called video subscriber by inquiry of the control unit at said another of said exchanges to the mapping circuit thereat, wherein one of said control units sets up a video telephone call over said broadband video telephone network after both of said video telephone numbers are obtained.

2. The integrated communication system of claim 1 further comprising one or more signaling channels interconnecting said exchanges.

3. The integrated communication system of claim 1 wherein each of said exchanges further comprises a narrowband switching network, an auxiliary control element connected to said narrowband switching network, and a broadband switching network connected to one of said telephone subscriber modules and wherein each of said telephone subscriber modules comprises a terminal and a terminal control element, each of said terminal control elements being connected to said narrowband switching network.

* * * * *